July 2, 1929.    C. O. RYBERG    1,719,237
LIFTING AND SNUBBING ATTACHMENT FOR VEHICLES
Filed Oct. 31, 1927
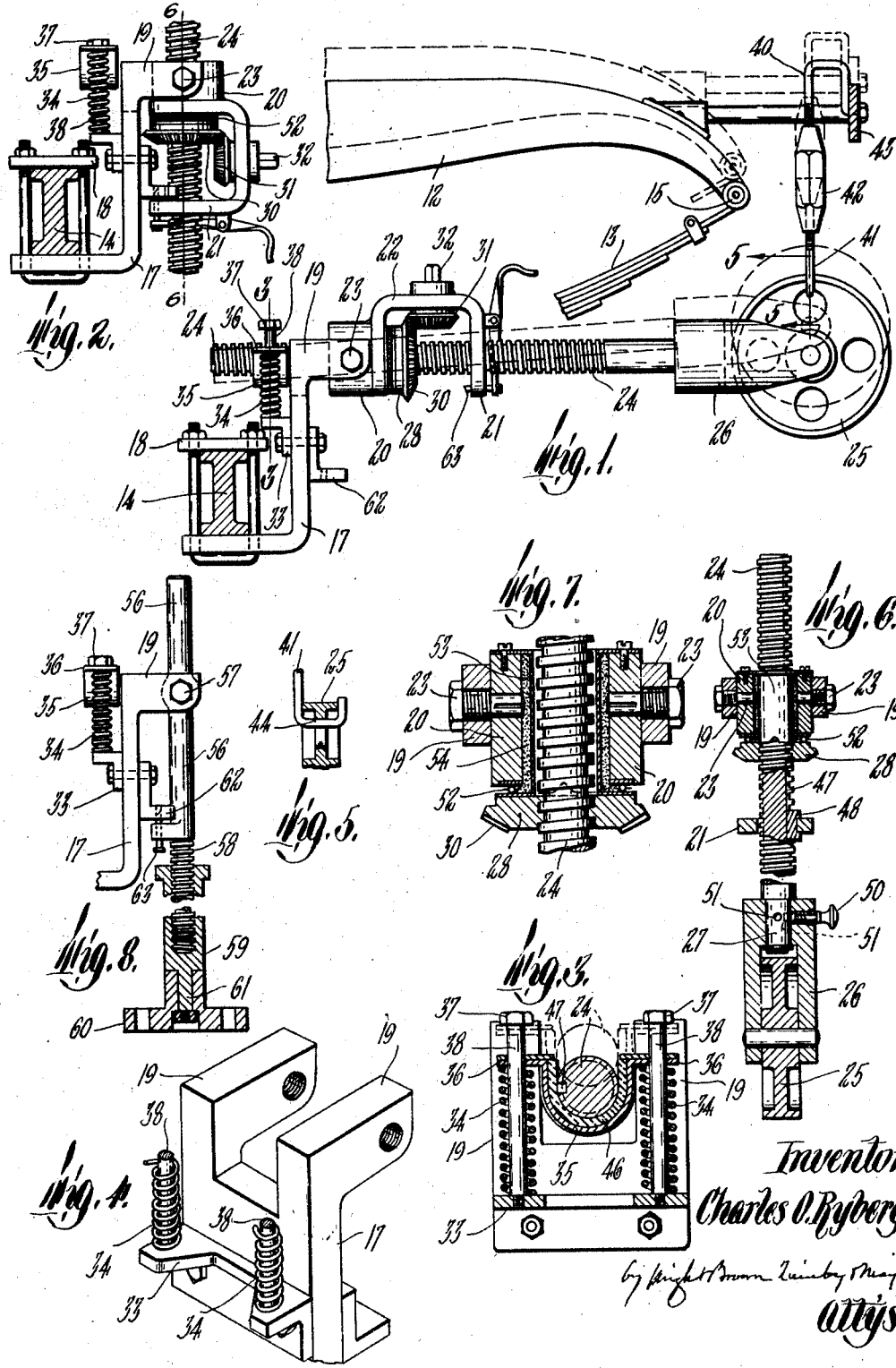

Patented July 2, 1929.

1,719,237

UNITED STATES PATENT OFFICE.

CHARLES O. RYBERG, OF BROCKTON, MASSACHUSETTS.

LIFTING AND SNUBBING ATTACHMENT FOR VEHICLES.

Application filed October 31, 1927. Serial No. 229,878.

This invention relates to an attachment adapted to be secured to an axle of a vehicle, so that it may be permanently carried thereby.

The chief object of the invention is to provide a vehicle attachment having a dual function, namely, to raise and lower the vehicle, and to reduce to a minimum the vertical movements or road vibrations of a spring-supported vehicle body.

Of the accompanying drawings forming a part of this specification.

Figure 1 is a side elevation of an attachment embodying the invention, conditioned to serve as a snubber.

Figure 2 is a view similar to a portion of Figure 1, showing the attachment conditioned to raise and lower a vehicle.

Figure 3 is a section on line 3—3 of Figure 1.

Figure 4 is a perspective view, showing portions of the holder and buffer hereinafter described.

Figure 5 is a fragmentary section on line 5—5 of Figure 1.

Figure 6 is a section on the plane indicated by line 6—6 of Figure 2, showing portions omitted from Figure 2.

Figure 7 is an enlargement of a portion of Figure 6.

Figure 8 is a view similar to portions of Figure 2, showing a modification.

The same reference characters indicate the same parts in all of the figures.

In the drawings, 12 (Figure 1) designates a portion of one of the spring-engaging members or horns, fixed to the body of a motor vehicle (not shown), and 13 a portion of one of the body springs, supported by an element, such as an axle 14 of the running gear of the vehicle, the parts 12 and 13 being connected at 15 as usual.

A holder attachable to the axle 14, is designated as a whole by 17. The holder is angular in this instance, and has a horizontal end portion bearing on the under side of the axle and fixed thereto by a clip 18, and an upright body portion located beside the axle and forked at its upper end, so that it has spaced apart arms 19, which project from one side of the body portion.

Pivotally connected with the holder, between the arms 19, is a jack structure, which may be of any suitable construction, whereby it is adapted to raise and lower the vehicle. In the preferred embodiment shown by Figures 1 to 7, the jack structure includes a frame composed of spaced apart guide members 20 and 21, and a neck 22, offset from and connecting said members, the member 20 being located between the holder arms 19, and connected therewith by pivot studs 23. Said structure also includes a screw-threaded jack standard 24, movable endwise in the guide members, and provided at one end with a foot adapted to bear on a supporting surface, the foot being preferably a wheel 25, journaled in a yoke 26, which is swivelled on a reduced end portion 27 of the standard, as shown by Figure 6. A circular nut 28, engaged with the thread of the standard 24, and provided with a bevel gear 30, on its periphery, is located beside the guide member 20, and is rotatable by a bevel gear 31, meshing with the gear 30, and having a shank journaled in the neck 22, one end 32 of the shank being squared to engage a wrench, whereby the gear 31 may be rotated to rotate the nut and move the standard endwise.

The described jack structure constitutes a lever adapted to serve as a snubber element, as hereinafter described, the fulcrum of the lever being at the studs 23, and one end of the standard 24 constituting a shorter arm of the lever.

The holder 17 supports a spring buffer constituting another snubber element, and composed, in this instance, of a spring abutment 33, fixed to one side of the body of the holder 17, a spring composed of two helical members 34, seated on the abutment, and a U-shaped head or rest 35, having flanges 36, seated on the upper ends of the spring members, and yieldingly supported thereby. The head 35 is in line with the space between the holder arms 19, and is normally supported by the spring members 34 in the raised position shown by Figure 2, against stops 37 on spring-retaining studs 38, fixed to the abutment, the ears of the head being slidable on the studs.

When the jack is swung to the horizontal position shown by Figure 1, the end portion of the standard 24, constituting the shorter lever arm, contacts with the head 35, and depresses it from the raised position shown by Figure 2, thus tensioning the spring members 34.

Another snubber element is a shackle, engaged at one end with a member fixed to the vehicle body, and separably engageable with an end portion of the jack, said portion being, in this instance, the wheel or rolling foot 25. The shackle is preferably composed of screw-threaded end members 40 and 41, and a turn-buckle 42 connecting said members, the length of the shackle being variable by rotation of the turn-buckle.

The member 40 is connected with a part movable vertically with the vehicle body, said part being, in this instance, a member 43 of a rear bumper, fixed to the body. The shackle member 41 may have a hook 44, separably engageable with the margin of a hole in the foot 25, as shown by Figure 5. The variability of the length of the shackle enables it to be elongated, to permit easy engagement of the hook 44 with the foot 25, and then shortened to cause the shackle to slightly raise the foot end of the jack.

The described jack structure is operable to raise and lower the vehicle when adjusted to an upright position, the foot 25 bearing on the ground or other support. Said structure is disclosed by my pending application, filed March 5, 1927, Serial No. 172,994.

When the jack is swung to an approximately horizontal position and secured by the shackle, it becomes a snubber element, cooperating with the shackle and the spring buffer in reducing to a minimum the vertical movements or road vibrations of the vehicle body, the buffer spring composed of the members 34 being tensioned and acting through the jack and shackle to yieldingly limit said vibrations.

The head or rest 35 is provided with a cushioning layer 46 (Figure 3) of rubber or other compressible material, on which the standard 24 bears when the standard is horizontally arranged.

Rotation of the standard 24 with the nut 28 may be prevented by providing the standard with a longitudinal groove or keyway 47 (Figure 6), and the guide member with a key 48, entering the keyway and permitting the standard to move endwise without rotation.

The yoke 26 may be confined in different angular positions, to permit the wheel 25 to stand in a plane permitting either endwise or lateral transportation of a vehicle elevated by a plurality of the described jacks. To this end the yoke 26 is provided with a spring-pressed detent pin 50, arranged to enter either of two radial holes 51 in the reduced portion 27 of the standard.

To lubricate the standard and the nut 28, and ball bearings 52, interposed between the nut and the guide member 20, I provide said member with an annular grease cup, communicating with the space between the nut and guide member, and adapted to supply grease thereto. The cup is formed by securing a tube 53 (Figure 7) in the bore of the guide member 20, said bore being enlarged, so that there is an annular space between it and the tube 53, adapted to receive a charge 54 of grease, which finds its way to the ball bearings and the screw threads of the standard and nut.

It is obvious that the jack structure may be differently constructed, to serve as a snubber element, as shown, for example, by Figure 8, in which 56 designates a jack member pivoted at 57 to the arms 19 of the holder 17, and provided with a screw-threaded end portion 58, engaging an internal thread in a tubular jack member 59. A foot 60 is swiveled on a stud 61 at one end of the member 59, so that when the foot bears on a supporting surface, the member 59 is rotatable to elongate and contract the jack. The jack structure last described is adapted to be converted into a snubber element, by swinging it to a horizontal position and confining it by the shackle.

In each of the jack structures shown, the holder 17 is provided with an ear 62, adapted to be engaged by a spring-pressed detent pin 63, to prevent a swinging movement of the jack from its upright position.

I claim:

1. An attachment for a wheeled vehicle which includes a spring-supported body, and an axle, said attachment having a dual function and comprising a holder having means whereby it may be fixed to the axle, a spring buffer supported by the holder and including a compressible spring, said buffer constituting a snubber element, a lifting-jack pivotally connected with the holder to swing in a vertical plane thereon, to an upright position, and a substantially horizontal position, the jack constituting a two-armed lever, whose arms project in opposite directions from the pivotal connection with the holder, one of said arms being arranged to contact with the buffer when the jack is substantially horizontal, and a shackle connected at one end with the body and separably engageable at its opposite end with the other arm of the jack, to hold the jack in contact with the buffer, the jack being operable, when upright, to raise and lower the vehicle, the arrangement being such that when the jack is engaged with the shackle, it cooperates with the buffer spring and the shackle in limiting the amplitude of vertical movements or road vibrations of the body.

2. A vehicle attachment as specified by claim 1, the shackle including means whereby its length may be varied, so that it may be lengthened to engage and release an arm of the jack, and shortened to variably tension the buffer spring.

3. A vehicle attachment, as specified by claim 1, the shackle being composed of threaded end members and a turn-buckle.

4. A vehicle attachment as specified by claim 1, one end of the holder being forked and projecting from one side of the holder body, the opposite side of said body being provided with a spring abutment, the buffer spring being seated on said abutment, the buffer including a head or rest, yieldingly supported by the spring, a portion of the lifting-jack being arranged to contact with the buffer head and tension the buffer spring, when the jack is substantially horizontal.

In testimony whereof I have affixed my signature.

CHARLES O. RYBERG.